United States Patent [19]

Wagenseil

[11] Patent Number: 5,007,332

[45] Date of Patent: Apr. 16, 1991

[54] PISTON FOR PISTON MACHINES

[75] Inventor: Ludwig Wagenseil, Vöhringen, Fed. Rep. of Germany

[73] Assignee: Hydromatik GmbH, Elchingen, Fed. Rep. of Germany

[21] Appl. No.: 502,460

[22] Filed: Mar. 30, 1990

[30] Foreign Application Priority Data

Apr. 13, 1989 [DE] Fed. Rep. of Germany ....... 3912213

[51] Int. Cl.[5] ....................... F01B 31/00; F04B 21/04; F16J 1/00

[52] U.S. Cl. .................................... 92/181 R; 92/172; 92/255; 92/261; 29/511; 29/888.04

[58] Field of Search ................. 92/172, 181 P, 181 R, 92/254, 255, 248, 249, 261; 29/888.04, 888.042, 888.044, 509, 510, 511, 515

[56] References Cited

U.S. PATENT DOCUMENTS

| | | | |
|---|---|---|---|
| 2,541,250 | 2/1951 | Hogg | 220/240 |
| 2,980,077 | 4/1961 | Magill | 92/255 |
| 3,178,907 | 4/1965 | Lyons | 29/511 |
| 3,187,644 | 6/1965 | Ricketts | 92/248 |
| 3,319,575 | 5/1967 | Havens | 92/255 |
| 3,633,467 | 1/1972 | Watanabe | 92/172 |
| 3,741,077 | 6/1973 | Hulsebus et al. | 92/248 X |
| 3,828,654 | 8/1974 | Wiethoff | 92/255 X |
| 3,896,707 | 7/1975 | Holmstrom | 92/172 |
| 3,915,071 | 10/1975 | Forster | 92/181 P X |
| 3,915,074 | 10/1975 | Bristow et al. | 92/172 |
| 3,984,904 | 10/1976 | Schlecht | 92/172 X |
| 3,999,468 | 12/1976 | Bristow et al. | 92/248 |
| 4,216,704 | 8/1980 | Heyl | 92/181 R X |
| 4,494,448 | 1/1985 | Eystratou et al. | 92/172 |
| 4,760,037 | 7/1988 | Ohdate | 29/511 X |
| 4,803,180 | 2/1989 | Ohdate | 29/511 X |

FOREIGN PATENT DOCUMENTS

| | | | |
|---|---|---|---|
| 1200609 | 9/1965 | Fed. Rep. of Germany | 92/255 |
| 2428017 | 1/1975 | Fed. Rep. of Germany | 92/248 |
| 8303650 | 10/1983 | World Int. Prop. O. | 92/248 |

*Primary Examiner*—Edward K. Look
*Assistant Examiner*—John Ryznic
*Attorney, Agent, or Firm*—Scully, Scott, Murphy & Presser

[57] ABSTRACT

In a piston for piston machines comprising a hollow body, open at least at its free end, having an axial cavity in which there is a filler piece at least partly filling the latter and consisting of a material of lower specific gravity than the material of the piston, said filler piece being secured in the cavity and being held axially in the cavity by a locking element arranged at the free end of the hollow body and a spring arranged between the locking element and the filler piece, the filler piece is inserted axially and the axial securing and locking is effected solely by the spring, which is pretensioned by the locking element to such an extent that it acts against the filler piece with a spring force greater than the maximum inertial forces of the filler piece acting against the spring to be expected when in operation.

11 Claims, 1 Drawing Sheet

FIG. 1
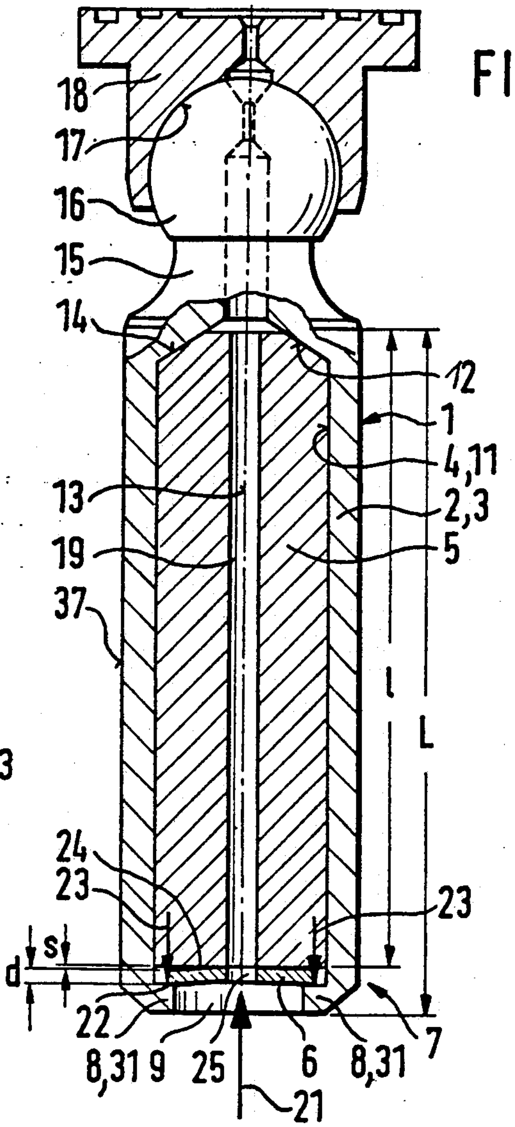
FIG. 2
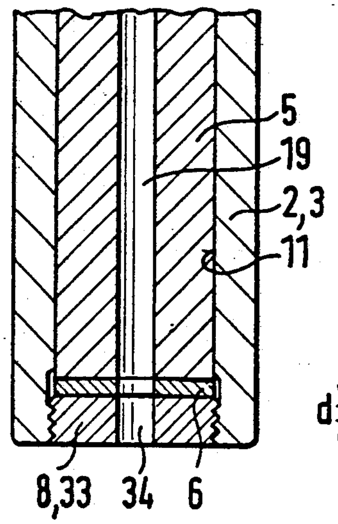
FIG. 3
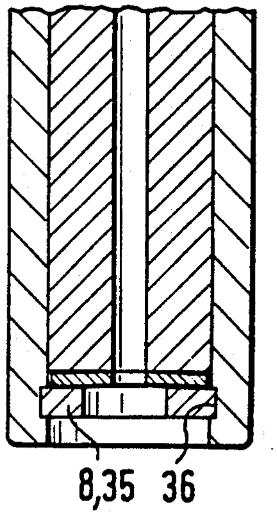
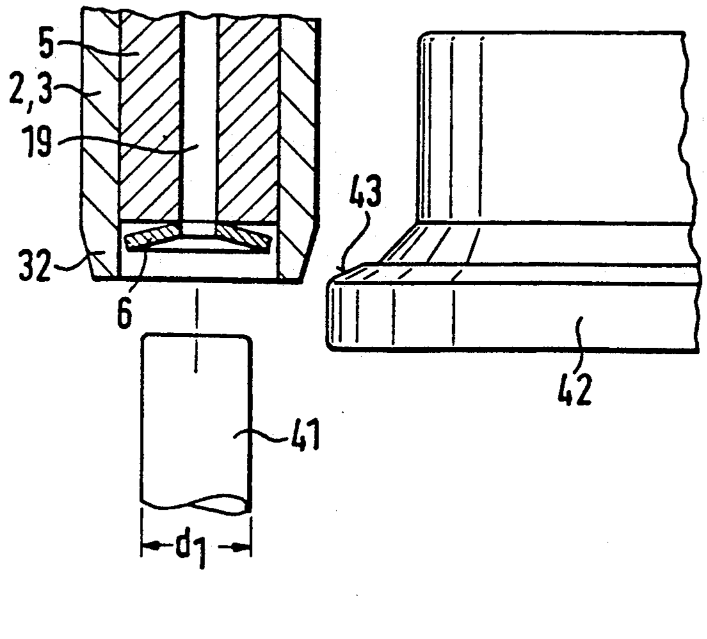
FIG. 4

PISTON FOR PISTON MACHINES

TECHNICAL FIELD OF THE INVENTION

The invention relates to a piston according to the preamble of claim 1.

BACKGROUND OF THE INVENTION AND PRIOR ART

A piston of this kind is described and illustrated in DD-PS 73 453. In this known embodiment the filler piece is tapered in steps towards its inner end, and the tapered section has an external thread with which the filler piece is screwed into a complementary internal thread in the wall of the cavity in the hollow body and is thus secured. To prevent unscrewing, a pin parallel to the axis is arranged at the free end of the hollow body and of the filler piece in a position in which it passes through the interface between the filler body and the hollow body. The locking pin is secured axially by a radial lock washer, inserted in an annular groove at the free end of the cavity, and a plate spring, inserted between the lock washer and the filler piece, whose dimensions are such that its peripheral edge extends in front of the facing end of the locking pin. The locking pin can thus not move axially out of its receiving hole.

This known embodiment is very complicated and expensive, not only because an external and internal thread and the receiving hole for the locking pin have to be provided but also because the locking pin must be fitted. Furthermore the axial securing of the filler piece is inadequate, because owing to the different materials and thermal coefficients of expansion of the hollow body and of the filler piece, the fluctuations in temperature to be expected in operation of the piston machine loosen the thread, although the filler piece is prevented from unscrewing axially by the locking pin.

OBJECT OF THE INVENTION

An object of the invention is to design a piston of the kind mentioned in the introduction so that loosening of the filler piece is prevented while the piston is economical to manufacture.

SUMMARY OF THE INVENTION

In the embodiment according to the invention all that is needed is to insert the filler piece axially into the hollow body. In doing so it is pretensioned, and thereby secured and fastened, only by the resilience of the spring, e.g. against the bottom of the cavity. As a result of this the filler piece cannot lift from its stop on the hollow body, and so loosening is prevented. The means of supporting the filler piece according to the invention can be manufactured in a simple manner and economically while ensuring reliable operation.

According to the invention a plate spring is employed in a position in which its central region presses with the aforementioned pretensioning against the filler piece while its peripheral edge bears away from the filler piece against the locking element. This embodiment also brings about effective support of the spring on the locking element.

The subclaims relate to further developments of the invention which further improve securing of the filler piece, lead to a compact, simple and economical construction and are of advantage for manufacturing reasons

BRIEF DESCRIPTION OF THE DRAWINGS

The invention will now be described in more detail with reference to preferred exemplary embodiments shown in the drawings, in which:

FIG. 1 shows an axial section of a piston designed according to the invention, FIGS. 2 and 3 show modified embodiments of the piston, FIG. 4 shows the piston shown in FIG. 1 in the course of manufacture.

DETAILED DESCRIPTION OF PREFERRED EMBODIMENTS OF THE INVENTION

The essential parts of the piston indicated generally by 1 are the cylindrical hollow body 3 forming the piston shaft 2, a filler piece 5 arranged in the cavity 4 in the hollow body 3 and consisting of a material that is less dense than the material of the hollow body 3, and a plate spring 6 which is inserted between the filler piece 5 and a locking element 8 at the outer end of the cavity 4 or its opening 9 at the free end 7 of the piston 1.

The cavity 4 is in the form of a blind bore 11, the bottom 12 of which is, as shown in FIG. 1, cone-shaped or can even extend at right angles to the middle axis 13 of the piston 1. At its inner end the filler piece 5 is adapted to the shape of the bottom 12 with its inner surface 14 adjoining the blind bore 11 in the bottom 12. The length l of the filler piece 5 is slightly less than the length L of the piston shaft 2 so that the free end 7 of the shaft projects over the outer end of the filler piece 5.

At the end of the piston 1 remote from the free end 7 is a piston neck 15 supporting a piston head 16 which is accommodated in a spherical recess 17 in a slipper 18, known per se, so as to be pivotable in all directions. An axial lubricating passage 19 extends longitudinally through the piston 1 to the slipper 18.

The filler piece 5 is accommodated in the blind bore 11 with as little radial play as possible. In the present exemplary embodiment it consists of an aluminium alloy. The filler piece 5 can be cast-in or preferably inserted or pressed in. It is advisable to press-fit the filler piece 5, as this also ensures radial clearance-free accommodation if, owing to different dimensions and/or coefficients of expansion, the hollow body 3 expands radially slightly more than the filler piece 5. The plate spring 6, shown in its original form in FIG. 4, is, as shown in FIG. 1, compressed into a substantially flat form between the filler piece 5 and the locking element 8, with the central region of the plate spring 6 pressing in the direction of the arrow 21 against the filler piece 5 while the peripheral edge 22 of the plate spring 6 is supported in the opposite direction, cf. arrow 23, on the locking element 8. The tension of the spring 6 is greater than the inertial force arising from the reciprocating movement of the piston 1, having regard to its speed and possible acceleration in the operation of the piston machine in which it is fitted, in particular an axial piston machine. As a result of this the filler piece 5 itself cannot lift from the bottom 12 of the blind bore 11 even if the filler piece 5 has a small amount of radial play in the blind bore 11. Owing to the above-mentioned tension of the plate spring 6 the filler piece 5 is held in a rattleproof manner in the blind bore 11. The distances between the outer end face 24 of the filler piece 5 and the locking element 8 is preferably slightly larger than the thickness d of the plate spring 6 so that when assembled there is clearance for movement S between the outer end face 24 of the filler piece 5 and the peripheral edge 22 of the plate spring 6. The amount of the clearance for movement S is preferably such that, in the event of axial, longitudinal expansion of the filler piece 5 which is greater than that of the hollow body 3, the filler piece 5 can expand relative to the hollow body 3 within the clearance for movement S. Despite this clearance S the filler piece 5 is held in a rattleproof manner in the blind bore 11 because of the tension of the plate spring 6.

In the present exemplary embodiment the plate spring 6 has a central circular hole 25, the diameter of which preferably corresponds to the diameter of the lubricating bore 19. The spring 6 forms an advantageous protection for the outer end of the outer end face 24 of the filler piece 5 in an embodiment with or without a hole 25, namely protection in particular against cavitation of the piston 1 in operation. Protection of this kind can be further improved in the case of a filler piece 5 of aluminium by forming a hardened coating, whereby the outer end face 24 or in particular the inner peripheral edge and the wall of the lubricating bore 19 of the filler piece 5 become harder or more resistant to wear.

There are several advantageous embodiments of the locking element 8. As shown in FIG. 1 the locking element 8 comprises a flange 31 on the edge 32 of the hollow body 3 that projects over the outer end of the filler piece 5, with the flange 31 engaging behind the outer periphery of the plate spring 6.

It is also possible to secure the filler piece 5 by a screw part 33 having an external thread that is screwed into an internal thread in the blind bore 11 or into a stepped recess at the free end of the cylindrical hollow body 3 and preferably butts up against the free end face of the piston 1 (FIG. 2). If there is a lubricating bore 19 in the piston 1 the screw part 33 also has a central bore 34 of corresponding cross-section. The screw part 33, on which at least one purchase element (not shown), e.g. two diametrically opposed blind holes accessible from outside, is provided, can be screwed so far into the hollow body 3 that the filler piece 5 is compressed against the bottom 12. However, it is preferred to leave a distance corresponding to the thickness d of the plate spring 6 and the clearance S, between the screw part 33 and the filler piece 5. In this position the screw part 33 can bear against a shoulder or the like of the blind bore 11 and be clamped by tightening, or it can be secured in this position by other means, e.g. by means of an agent known for this purpose, such as Loctite. It is advisable to make the screw part 33 in the form of an internal nut with a self-locking thread.

In the exemplary embodiment shown in FIG. 3 the locking element 8 comprises a radial spring washer 35 which is inserted in a groove 36 in the wall of the blind bore 11. In this exemplary embodiment also a space is left between the radial spring washer 35 and the filler piece 5 corresponding to the thickness d of the plate spring 6 and the clearance S. The plate springs 6 in all of the exemplary embodiments described above are identical.

The surface treatment of the piston 1 and/or its piston shaft 2 shown in FIG. 1 is preferably carried out according to the following treatment or manufacturing steps:

1. Turning the piston 1.
2. Pushing or pressing in the filler piece 5.
3. Flanging the plate spring 6, preferably by rolling the edge 32 of the hollow body 3 projecting over the plate spring 6.
4. Grinding the entire outer contour of the piston 1.
5. Nitriding the piston 1 and the piston shaft 2.
6. Precision grinding the outer surface 37 and the piston head 16 of the piston 1 and/or of the piston shaft 2 and piston head 16.

The flanging is effected by rolling, preferably as follows:

3.1 Pressing the spring plate 6 against the filler piece 5 by a bolt 41 which is pressed axially from outside against the spring plate 6 and the filler piece 5, as shown in FIG. 4, so that the plate spring 6 is compressed flat.

3.2 Fastening the spring plate 6 by rolling.

3.3 Finish rolling and flanging, preferably with a form roller 42 having an oblique rolling or contact profile 43, as shown in FIG. 4, which can approach the piston 1 laterally or radially.

The diameter $d_1$ of the bolt 41 is slightly smaller than that of the opening 9 at the free end of the piston 1 and piston shaft 2 bordered by the flange 31.

The piston 1 is made in one piece and consists of steel, in particular alloyed steel.

What is claimed is:

1. A piston for piston machines comprising a hollow body, open at least at its free end, having an axial cavity in which there is a filler piece at least partly filling the latter and consisting of a material of lower specific gravity than the material of the piston, said filler piece being secured in said cavity and being held axially in said cavity by a locking element arranged at the free end of said hollow body and a spring arranged between said locking element and said filler piece, wherein said filler piece is inserted axially into said cavity and the axial securing and locking is effected solely by said spring and said locking element, said spring being pretensioned by said locking element so far that it acts against said filler piece with a spring force greater than the maximum inertial forces of the filler piece acting against said spring to be expected when in operation.

2. A piston according to claim 1, wherein said spring is a plate spring which is inserted in a position in which its central region adjoins said filler piece.

3. A piston according to claim 1, wherein all mutually contacting axial regions of the walls of said cavity and of the outer surface of said filler piece are in alignment with the axis of said piston.

4. A piston according to claim 1, wherein said filler piece is pushed into said cavity, and preferably pressed thereinto with radial tension.

5. A piston according to claim 2, wherein said plate spring is compressed so that it is substantially flat.

6. A piston according to claim 2, wherein between the peripheral edge of said plate spring and said filler piece there is an axial clearance (S) which is equal to or greater than an increase in the length of said filler piece relative to said hollow body caused by temperature differences encountered in operation.

7. A piston according to claim 1, wherein said locking element comprises a flange on the edge of said hollow body projecting over said spring.

8. A piston according to claim 1, wherein said locking element is a screw part screwed into the free end of said hollow body.

9. A piston according to claim. 1, wherein said locking element is a radial spring washer inserted in a groove in the wall of said cavity.

10. A piston according to claim 1, wherein an axial lubricating passage extends in said piston and in said filler piece, and a hole coaxial with said lubricating passage and preferably of the same cross-section, is provided in said locking element.

11. A piston according to claim 1, wherein at least the outer end of said filler piece and the wall of said lubricating passage, preferably the entire filler piece, is hardened by means selected from the group consisting of surface hardening, anodizing and hard-coating.

* * * * *